United States Patent
White et al.

(10) Patent No.: US 11,800,605 B2
(45) Date of Patent: Oct. 24, 2023

(54) CIRCUITRY FOR A PLURALITY OF INDUCTION ELEMENTS FOR AN AEROSOL GENERATING DEVICE

(71) Applicant: NICOVENTURES TRADING LIMITED, London (GB)

(72) Inventors: Julian White, Cambridge (GB); Martin Horrod, Cambridge (GB)

(73) Assignee: Nicoventures Trading Limited, London (GB)

( * ) Notice: Subject to any disclaimer, the term of this patent is extended or adjusted under 35 U.S.C. 154(b) by 437 days.

(21) Appl. No.: 15/733,296

(22) PCT Filed: Dec. 20, 2018

(86) PCT No.: PCT/EP2018/086145
§ 371 (c)(1),
(2) Date: Jun. 22, 2020

(87) PCT Pub. No.: WO2019/122097
PCT Pub. Date: Jun. 27, 2019

(65) Prior Publication Data
US 2021/0093012 A1    Apr. 1, 2021

(30) Foreign Application Priority Data
Dec. 21, 2017  (GB) ..................... 1721612

(51) Int. Cl.
*H02M 3/335* (2006.01)
*H02M 7/48* (2007.01)
(Continued)

(52) U.S. Cl.
CPC .......... *H05B 6/108* (2013.01); *A24F 40/465* (2020.01); *A24F 40/50* (2020.01); *A24F 40/57* (2020.01);
(Continued)

(58) Field of Classification Search
CPC .......... H02M 3/33571; H02M 7/4815; H02M 7/5387; H05B 6/105; H05B 6/108; H05B 6/109
See application file for complete search history.

(56) References Cited

U.S. PATENT DOCUMENTS

| | | |
|---|---|---|
| 5,613,505 A | 3/1997 | Campbell et al. |
| 8,576,019 B2 | 11/2013 | Czimmek et al. |

(Continued)

FOREIGN PATENT DOCUMENTS

| | | | |
|---|---|---|---|
| CA | 3002585 A1 * | 4/2017 | ............. A24D 1/002 |
| CN | 104095291 A * | 10/2014 | ........... A24F 47/008 |

(Continued)

OTHER PUBLICATIONS

English translation of "CN 206251000", Xu, Peng, Inverter Circuit Based on HPWM Modulation (Year: 2017).*

(Continued)

*Primary Examiner* — Sisay G Tiku
(74) *Attorney, Agent, or Firm* — Patterson Thuente, PA (57) ABSTRACT

Circuitry for a plurality of induction elements for an aerosol generating device is disclosed. Each of the plurality of induction elements is for inductive heating of one or more susceptors for heating aerosol generating material in use. The circuitry includes a plurality of driver arrangements, each one of the plurality of driver arrangements being arranged to provide, from an input direct current, an alternating current to a respective one of the plurality of induction elements in use. Each driver arrangement includes one or more first transistors each controllable by a switching potential to substantially allow current to pass therethrough in use. The circuitry also includes a converter arranged to (Continued)

step up an input potential to provide the switching potential in use, the converter being common to each of the plurality of driver arrangements.

23 Claims, 3 Drawing Sheets

(51) Int. Cl.
*H02M 7/5387* (2007.01)
*H05B 6/04* (2006.01)
*H05B 6/10* (2006.01)
*H05B 6/44* (2006.01)
*A24F 40/465* (2020.01)
*A24F 40/50* (2020.01)
*A24F 40/57* (2020.01)
*A24F 40/20* (2020.01)

(52) U.S. Cl.
CPC ..... *H02M 3/33571* (2021.05); *H02M 7/5387* (2013.01); *H05B 6/04* (2013.01); *H05B 6/105* (2013.01); *H05B 6/44* (2013.01); *A24F 40/20* (2020.01); *H02M 7/4815* (2021.05)

(56) References Cited

U.S. PATENT DOCUMENTS

| | | | |
|---|---|---|---|
| 9,060,388 B2 | 6/2015 | Liu | |
| 10,028,533 B2 | 7/2018 | Fursa et al. | |
| 10,028,535 B2 | 7/2018 | Mironov | |
| 10,524,508 B2 | 1/2020 | Sur et al. | |
| 10,582,726 B2 | 3/2020 | Sur et al. | |
| 11,164,694 B2 * | 11/2021 | Kumar | H02M 3/158 |
| 2004/0149737 A1 | 8/2004 | Sharpe et al. | |
| 2016/0227840 A1 | 8/2016 | Xiang | |
| 2016/0366947 A1 | 12/2016 | Monsees et al. | |
| 2019/0029078 A1 * | 1/2019 | Steele | H05B 6/062 |
| 2020/0022412 A1 | 1/2020 | Abi Aoun et al. | |
| 2020/0037402 A1 | 1/2020 | Abi Aoun et al. | |
| 2020/0237018 A1 | 7/2020 | Sur | |
| 2021/0029786 A1 * | 1/2021 | Lee | H05B 6/06 |
| 2021/0093012 A1 | 4/2021 | White et al. | |
| 2021/0169146 A1 | 6/2021 | Korus et al. | |
| 2021/0186109 A1 | 6/2021 | Milligan et al. | |
| 2022/0039472 A1 | 2/2022 | White et al. | |
| 2022/0160045 A1 | 5/2022 | Horrod et al. | |
| 2022/0225680 A1 | 7/2022 | Lopez | |
| 2022/0225685 A1 * | 7/2022 | Blackmon | A24F 40/53 |

FOREIGN PATENT DOCUMENTS

| | | | | |
|---|---|---|---|---|
| CN | 203952405 U | * | 11/2014 | |
| CN | 203969194 U | * | 12/2014 | |
| CN | 204411440 U | * | 6/2015 | ............ A61M 11/00 |
| CN | 204888733 U | * | 12/2015 | |
| CN | 206227716 U | | 6/2017 | |
| CN | 206251000 U | * | 6/2017 | |
| CN | 107039980 A | * | 8/2017 | ................ H02J 3/06 |
| CN | 108991603 A | * | 12/2018 | |
| CN | 110476477 A | * | 11/2019 | ........... A24F 40/465 |
| EP | 3295813 A1 | | 3/2018 | |
| KR | 100385395 B1 | | 8/2003 | |
| KR | 20150143891 A | | 12/2015 | |
| KR | 102424249 B1 | * | 7/2022 | |
| WO | 9527411 A1 | | 10/1995 | |
| WO | 2016169446 A1 | | 10/2016 | |
| WO | WO-2017068098 A1 | * | 4/2017 | ............. A24D 1/002 |
| WO | WO-2017068100 A1 | * | 4/2017 | ............. A24D 1/002 |
| WO | 2017205692 A1 | | 11/2017 | |
| WO | WO-2021225376 A1 | * | 11/2021 | ........ H02M 7/53871 |

OTHER PUBLICATIONS

Office action for Canadian Application No. 3121581, dated Oct. 21, 2022, 3 pages.
Office action for Canadian Application No. 3121583, dated Oct. 14, 2022, 4 pages.
Office Action for Korean Application No. 10-2020-7017740, dated Feb. 8, 2022, 14 pages.
Office Action for Korean Application No. 10-2020-7017746, dated Aug. 18, 2022, 13 pages.
Office Action for Korean Application No. 10-2020-7017746, dated Feb. 10, 2022, 25 pages.
International Preliminary Report on Patentability received for PCT Patent Application No. PCT/EP2018/086138, dated Jul. 2, 2020, 8 pages.
International Preliminary Report on Patentability received for PCT Patent Application No. PCT/EP2018/086145, dated Jul. 2, 2020, 8 pages.
International Search Report and Written Opinion received for PCT Patent Application No. PCT/EP2018/086138, dated Mar. 29, 2019, 11 pages.
International Search Report and Written Opinion received for PCT Patent Application No. PCT/EP2018/086145, dated Apr. 10, 2019, 12 pages.

* cited by examiner

CIRCUITRY FOR A PLURALITY OF INDUCTION ELEMENTS FOR AN AEROSOL GENERATING DEVICE

PRIORITY CLAIM

The present application is a National Phase entry of PCT Application No. PCT/EP2018/086145, filed Dec. 20, 2018, which claims priority from GB Patent Application No. 1721612.8, filed Dec. 21, 2017, each of which is hereby fully incorporated herein by reference.

TECHNICAL FIELD

The present disclosure relates to circuitry for a plurality of induction elements, and more specifically to circuitry for a plurality of induction elements for an aerosol generating device, the plurality of induction elements being for inductive heating of one or more susceptors for heating an aerosol generating material in use.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called "heat not burn" products or tobacco heating devices or products, which release compounds by heating, but not burning, material. The material may be, for example, tobacco or other non-tobacco products, which may or may not contain nicotine.

SUMMARY

According to a first aspect of the present disclosure, there is provided circuitry for a plurality of induction elements for an aerosol generating device, the plurality of induction elements being for inductive heating of one or more susceptors for heating aerosol generating material in use, the circuitry comprising: a plurality of driver arrangements, each one of the plurality of driver arrangements being arranged to provide, from an input direct current, an alternating current to a respective one of the plurality of induction elements in use; each driver arrangement comprising one or more first transistors each controllable by a switching potential to substantially allow current to pass therethrough in use; and a converter arranged to step up an input potential to provide the switching potential in use, the converter being common to each of the plurality of driver arrangements.

Optionally, one or more of the plurality of driver arrangements comprises a plurality of transistors arranged in a H-bridge configuration, wherein one or more of the plurality of transistors is a said first transistor.

Optionally, the H-bridge configuration comprises a high side pair of transistors and a low side pair of transistors, the high side pair being for connection to a first electric potential higher than a second electric potential to which the low side pair is for connection is use, wherein one or both of the high side pair of transistors is a said first transistor.

Optionally, the converter is arranged such that in use the switching potential is higher than the first potential.

Optionally, one or both of the low side pair of transistors is a said first transistor.

Optionally, each driver arrangement is arranged for connection of a DC power source in use across a first point between the high side pair of transistors and a second point between the low side pair of transistors.

Optionally, each driver arrangement is arranged for connection of the respective induction element in use across a third point between a one of the high side pair of transistors and one of the low side pair of transistors and a fourth point between the other of the high side pair of transistors and the other of low side second pair of transistors.

Optionally, each first transistor is arranged such that, when the switching potential is provided to the first transistor then the first transistor substantially allows current to pass therethrough, and when the switching potential is not provided to the transistor then the transistor substantially prevents current from passing therethrough.

Optionally, each first transistors is a field effect transistor.

Optionally, each first transistor comprises a source, a drain, and a gate, and in use the switching potential is provided to the gate of each transistor.

Optionally, each of the first transistors is an n-channel field effect transistor.

Optionally, each of the first transistors is a metal-oxide-semiconductor field effect transistor.

Optionally, the circuitry comprises a supply bus for supplying the switching potential from the converter to the plurality of driving arrangements in use.

Optionally, the supply bus is controllable to supply the switching potential to one or more of the plurality of driving arrangements in use.

Optionally, the circuitry comprises a supply bus controller arranged to control the supply bus to supply the switching potential to a selectable one or more of the plurality of driving arrangements in use.

Optionally, each driving arrangement comprises a driver controller arranged to control supply of the switching potential to the one or more first transistors of the driving arrangement.

Optionally, each of the plurality of driver arrangements are arranged for common connection to a or the DC power source to provide the input direct current in use.

Optionally, the converter is arranged for connection to a or the DC power source to provide the input potential in use.

Optionally, the converter is or comprises a boost converter.

According to a second aspect of the present disclosure, there is provided an aerosol generating device comprising: the circuitry according to the first aspect.

Optionally, the aerosol generating device further comprises: a or the DC power source, the DC power source being arranged to provide the input direct current in use and/or being arranged to provide the input potential in use.

Optionally, the aerosol generating device further comprises:
the plurality of induction elements;
and each driver arrangement is arranged to provide alternating current to a respective one of the plurality of induction elements in use.

Optionally, the aerosol generating device further comprises: the one or more susceptors; and the one or more susceptors are arranged to be inductively heated by the plurality of induction elements in use.

Optionally, the aerosol generating device further comprises: the aerosol generating material; and the aerosol generating material is arranged to be heated by the one or more susceptors in use.

Optionally, the aerosol generating material is or comprises tobacco.

DETAILED DESCRIPTION

Induction heating is a process of heating an electrically conducting object (or susceptor) by electromagnetic induction. An induction heater may comprise an induction element, such as an electromagnet, and circuitry for passing a varying electric current, such as an alternating electric current, through the electromagnet. The varying electric current in the electromagnet produces a varying magnetic field. The varying magnetic field penetrates a susceptor suitably positioned with respect to the electromagnet, generating eddy currents inside the susceptor. The susceptor has electrical resistance to the eddy currents, and hence the flow of the eddy currents against this resistance causes the susceptor to be heated by Joule heating. In cases whether the susceptor comprises ferromagnetic material such as iron, nickel or cobalt, heat may also be generated by magnetic hysteresis losses in the susceptor, i.e. by the varying orientation of magnetic dipoles in the magnetic material as a result of their alignment with the varying magnetic field.

In inductive heating, as compared to heating by conduction for example, heat is generated inside the susceptor, allowing for rapid heating. Further, there need not be any physical contact between the inductive heater and the susceptor, allowing for enhanced freedom in construction and application.

An induction heater may comprise an RLC circuit, comprising a resistance (R) provided by a resistor, an inductance (L) provided by an induction element, for example the electromagnet which may be arranged to inductively heat a susceptor, and a capacitance (C) provided by a capacitor, connected in series. In some cases, resistance is provided by the ohmic resistance of parts of the circuit connecting the inductor and the capacitor, and hence the RLC circuit need not necessarily include a resistor as such. Such a circuit may be referred to, for example as an LC circuit. Such circuits may exhibit electrical resonance, which occurs at a particular resonant frequency when the imaginary parts of impedances or admittances of circuit elements cancel each other. Resonance occurs in an RLC or LC circuit because the collapsing magnetic field of the inductor generates an electric current in its windings that charges the capacitor, while the discharging capacitor provides an electric current that builds the magnetic field in the inductor. When the circuit is driven at the resonant frequency, the series impedance of the inductor and the capacitor is at a minimum, and circuit current is maximum. Driving the RLC or LC circuit at or near the resonant frequency may therefore provide for effective and/or efficient inductive heating.

A transistor is a semiconductor device for switching electronic signals. A transistor typically comprises at least three terminals for connection to an electronic circuit.

A field effect transistor (FET) is a transistor in which the effect of an applied electric field may be used to vary the effective conductance of the transistor. The field effect transistor may comprise a body B, a source terminal S, a drain terminal D, and a gate terminal G. The field effect transistor comprises an active channel comprising a semiconductor through which charge carriers, electrons or holes, may flow between the source S and the drain D. The conductivity of the channel, i.e. the conductivity between the drain D and the source S terminals, is a function of the potential difference between the gate G and source S terminals, for example generated by a potential applied to the gate terminal G. In enhancement mode FETs, the FET may be off (i.e. substantially prevent current from passing therethrough) when there is substantially zero gate G to source S voltage, and may be turned on (i.e. substantially allow current to pass therethrough) when there is a substantially non-zero gate G-source voltage.

An n-channel (or n-type) field effect transistor (n-FET) is a field effect transistor whose channel comprises a n-type semiconductor, where electrons are the majority carriers and holes are the minority carriers. For example, n-type semiconductors may comprise an intrinsic semiconductor (such as silicon for example) doped with donor impurities (such as phosphorus for example). In n-channel FETs, the drain terminal D is placed at a higher potential than the source terminal S (i.e. there is a positive drain-source voltage, or in other words a negative source-drain voltage). In order to turn an n-channel FET "on" (i.e. to allow current to pass therethrough), a switching potential is applied to the gate terminal G that is higher than the potential at the source terminal S.

A metal-oxide-semiconductor field effect transistor (MOSFET) is a field effect transistor whose gate terminal G is electrically insulated from the semiconductor channel by an insulating layer. In some examples, the gate terminal G may be metal, and the insulating layer may be an oxide (such as silicon dioxide for example), hence "metal-oxide-semiconductor". However, in other examples, the gate may be from other materials than metal, such as polysilicon, and/or the insulating layer may be from other materials than oxide, such as other dielectric materials. Such devices are nonetheless typically referred to as metal-oxide-semiconductor field effect transistors (MOSFETs), and it is to be understood that as used herein the term metal-oxide-semiconductor field effect transistors or MOSFETs is to be interpreted as including such devices.

A MOSFET may be an n-channel (or n-type) MOSFET where the semiconductor is n-type. The n-channel MOSFET (n-MOSFET) may be operated in the same way as described above for the n-channel FET. An n-MOSFET typically has a relatively low source-drain resistance and hence in an "on" state (i.e. where current is passing therethrough), n-MOSFETs generate relatively little heat in use and hence waster relatively little energy in operation. Further, n-MOSFETs typically have relatively short switching times (i.e. a characteristic response time from changing the switching potential provided to the gate terminal G to the MOSFET changing whether or not current passes therethrough), which can allow for relatively high switching rates. This may for example, allow for improved switching control and, for example reduce the occurrence of shoot-through, where a short circuit may be momentarily provided where a transistor is not closed quickly enough.

Figure 1:
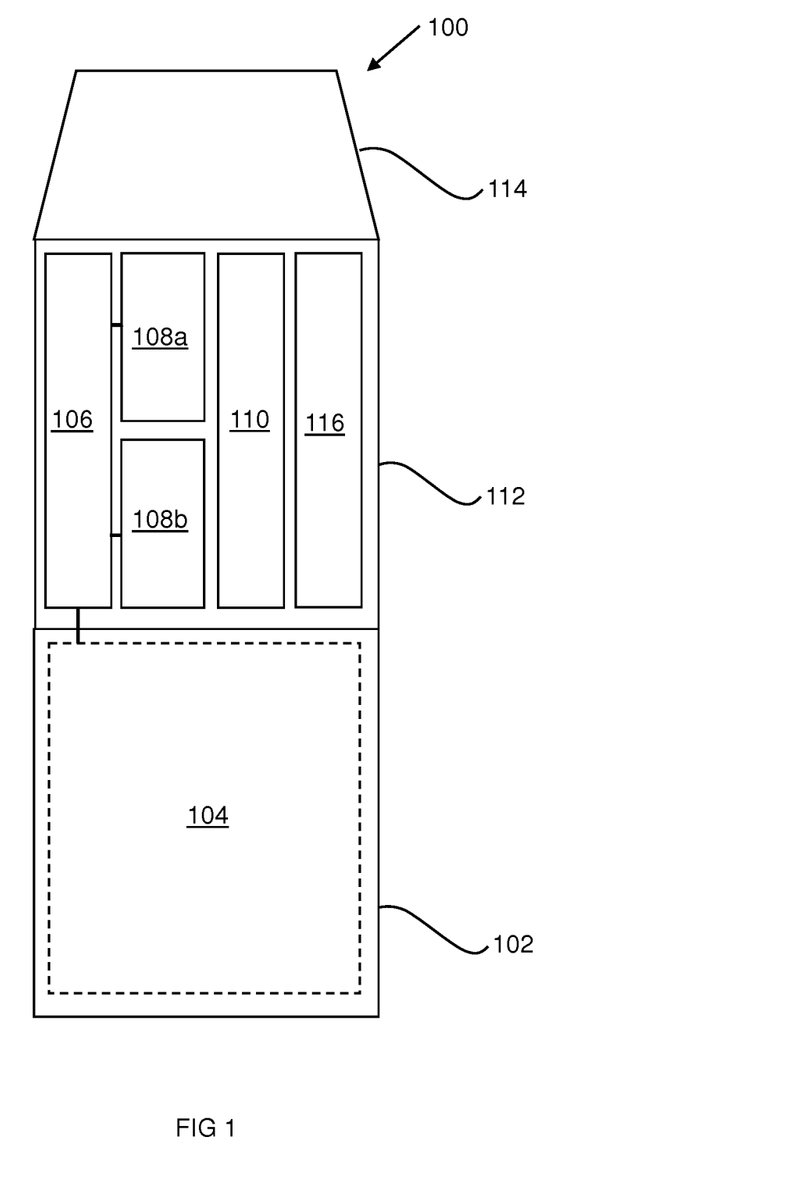
FIG. 1 illustrates schematically an aerosol generating device according to an example.

FIG. 1 illustrates schematically a device 100, according to an example. The device 100 is an aerosol generating device 100. The aerosol generating device 100 comprises a DC power source 104, in this example a battery 104, circuitry 106, a plurality of induction elements 108a, 108b, a susceptor 110, and aerosol generating material 116. The DC power source 104 is electrically connected to the circuitry 106. The DC power source is 104 is arranged to provide DC electrical power to the circuitry 106. The circuitry 106 is electrically connected to each induction element 108a, 108b. Each induction element 108a, 108b may be, for example, an electromagnet, for example a coil or solenoid, which may for example be planar, which may for example be formed from copper. The circuitry 106 is arranged to convert an input DC current from the DC power source 104 into a varying, for example alternating, current. The circuitry 106 is arranged to drive the alternating current through one or more, for example each, of the induction elements 108a 108b.

The susceptor 110 is arranged relative to each induction elements 108a, 108b for inductive energy transfer from each induction element 108a, 108b to the susceptor 110. Specifically, for example, a first induction element 108a may be arranged for inductive heating of a first portion of the susceptor 110 to which the first induction element 108a is adjacent, and the second induction element 108b may be arranged for inductive heating of a second portion of the susceptor 110 to which the second induction element 108b is adjacent. For example, the portion of the susceptor that is inductively heated may therefore be controlled based on activating one or a combination of the plurality of induction heating elements 108a, 108b. The susceptor 110 may comprise a ferromagnetic portion, which may comprise one or a combination of example metals such as iron, nickel and cobalt. Each induction element 108a, 108b, having alternating current driven therethrough, causes the susceptor 110 to heat up by Joule heating and/or by magnetic hysteresis heating, as described above. The susceptor 110 is arranged to heat the aerosol generating material 116, for example by conduction, convection, and/or radiation heating, to generate an aerosol in use.

In some examples, the susceptor 110 and the aerosol generating material 116 form an integral unit that may be inserted and/or removed from the aerosol generating device 100, and may be disposable. In some examples, the induction element 108 may be removable from the device 100, for example for replacement. In one example (not illustrated), each one of the plurality of induction elements 108a, 108b may be arranged for inductive heating of a respective one of a plurality of separate susceptors (not shown), for example each arranged for heating of a portion of aerosol generating material (not shown). The aerosol generating device 100 may be hand-held. The aerosol generating device 100 may be arranged to heat the aerosol generating material 116 to generate aerosol for inhalation by a user.

It is noted that, as used herein, the term "aerosol generating material" includes materials that provide volatilized components upon heating, typically in the form of vapor or an aerosol. Aerosol generating material may be a non-tobacco-containing material or a tobacco-containing material. For example, the aerosol generating material may be or comprise tobacco. Aerosol generating material may, for example, include one or more of tobacco per se, tobacco derivatives, expanded tobacco, reconstituted tobacco, tobacco extract, homogenized tobacco or tobacco substitutes. The aerosol generating material can be in the form of ground tobacco, cut rag tobacco, extruded tobacco, reconstituted tobacco, reconstituted material, liquid, gel, gelled sheet, powder, or agglomerates, or the like. Aerosol generating material also may include other, non-tobacco, products, which, depending on the product, may or may not contain nicotine. Aerosol generating material may comprise one or more humectants, such as glycerol or propylene glycol.

Returning to FIG. 1, the aerosol generating device 100 comprises an outer body 112 housing the battery 104, the control circuitry 106, the induction elements 108a, 108b, the susceptor 110, and the aerosol generating material 116. The outer body 112 comprises a mouthpiece 114 to allow aerosol generated in use to exit the device 100.

In use, a user may activate, for example via a button (not shown) or a puff detector (not shown) which is known per se, the circuitry 106 to cause alternating current to be driven through one or more of the induction elements 108a, 108b, thereby inductively heating the susceptor 110 (or a portion thereof), which in turn heats the aerosol generating material 116, and causes the aerosol generating material 116 thereby to generate an aerosol. The aerosol is generated into air drawn into the device 100 from an air inlet (not shown), and is thereby carried to the mouthpiece 114, where the aerosol exits the device 100.

The circuitry 106, induction elements 108a, 108b, susceptor 110 and/or the device 100 as a whole may be arranged to heat the aerosol generating material 116 or a portion thereof to a range of temperatures to volatilize at least one component of the aerosol generating material without combusting the aerosol generating material 116. For example, the temperature range may be about 50° C. to about 350° C., such as between about 50° C. and about 250° C., between about 50° C. and about 150° C., between about 50° C. and about 120° C., between about 50° C. and about 100° C., between about 50° C. and about 80° C., or between about 60° C. and about 70° C. In some examples, the temperature range is between about 170° C. and about 220° C. In some examples, the temperature range may be other than this range, and the upper limit of the temperature range may be greater than 300° C.

Figure 2:
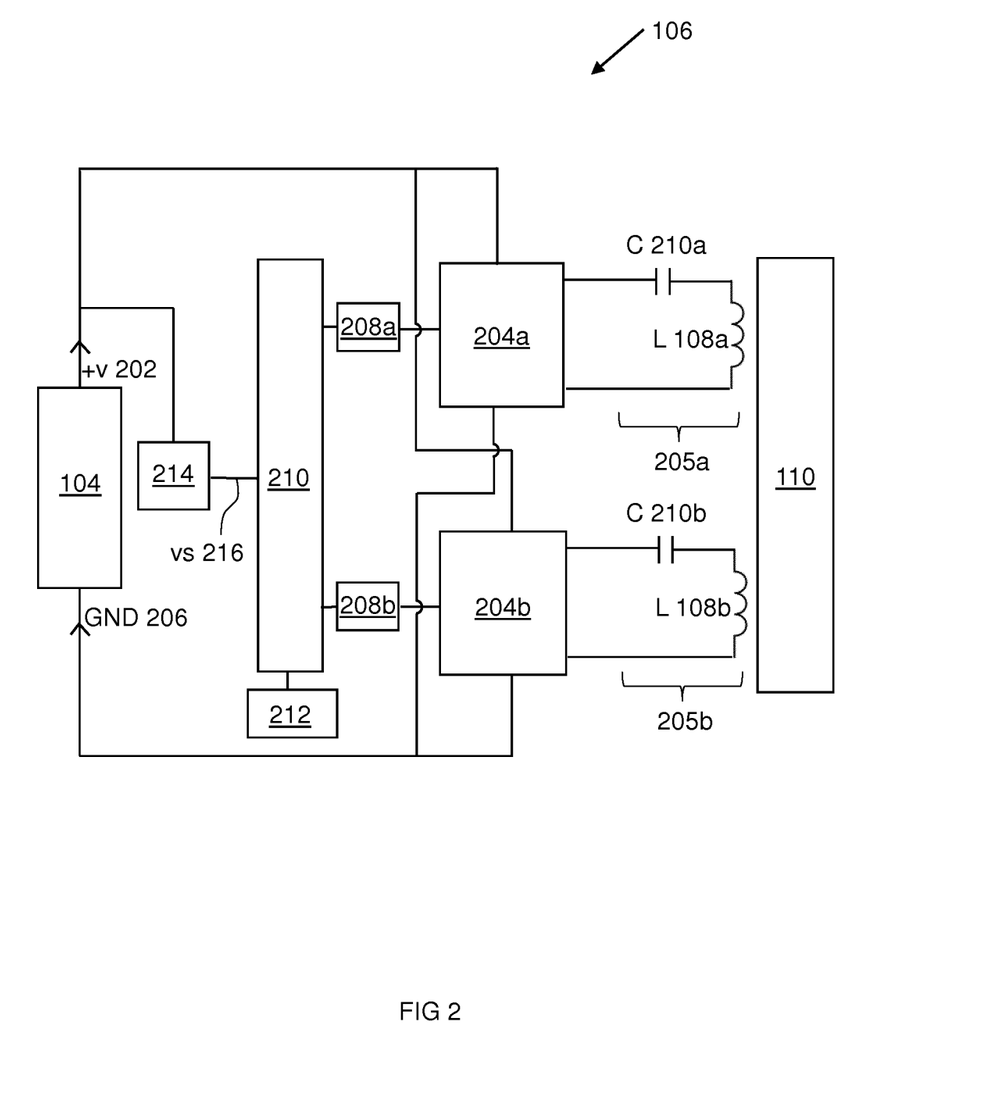
FIG. 2 illustrates schematically circuitry for a plurality of induction elements, according to an example.

Referring now to FIG. 2, there is illustrated schematically in more detail the circuitry 106 for the plurality of induction elements 108a, 108b for the aerosol generating device 100, according to an example.

The circuitry 106 comprises a plurality, in this example two, driver arrangements 204a, 204b. Each driver arrangement 204a, 204b is electrically connected to the battery 104. Specifically, each driver arrangement 204a, 204b is connected to a positive terminal of the battery 104, that provides relatively high electric potential +v 202, and to a negative terminal of the battery or to ground, which provides a relatively low or no or negative electric potential GND 206. A voltage is therefore established across each driver arrangement 204a, 204b.

Each driver arrangement 204a, 204b is electrically connected to a respective LC circuit 205a, 205b. Each LC circuit 205a, 205b comprises a respective one of the induction elements 108a, 108b having inductance L, and a capacitor 210a, 210b having capacitance C. In each LC circuit 205a, 205b, the induction element 108a, 108b and the capacitor 210a, 210b are connected in series.

Each one of the plurality of driver arrangements 204a, 204b is arranged to provide, from an input direct current from the battery 104, an alternating current to a respective one of the plurality of LC circuits 205a, 205b, and hence to a respective one of the plurality of induction elements 108a, 108b, in use. Each driver arrangement 204a, 204b is connected in common to the DC power source or battery 104 to provide the input direct current in use.

Each driver arrangement 204a, 204b is electrically connected to a respective driver controller 208a, 208b, for example comprising logic circuitry. Each driver controller 208a, 208b is arranged to control the respective driver arrangement 204a, 204b, or components thereof, to provide the output alternating current from the input direct current. Specifically, as described in more detail below, each driver controller 208a, 208b may be arranged to control the provision of a switching potential vs 216 to one or more transistors of the respective driver arrangement 204a, 204b at varying times to cause the respective driver arrangement 204a, 204b to produce the alternating current.

Each driver controller 208a, 208b may be arranged to control the frequency of alternating current provided to the respective LC circuit 205a, 205b and hence the frequency of the alternating current driven through the respective induction element 108a, 108b. As mentioned above, LC circuits may exhibit resonance. Each driver controller 208a, 208b may control the frequency of the alternating current driven through the respective LC circuit 205a, 205b (the drive frequency) to be at or near the resonant frequency of the LC circuit 205a, 205b. For example, the drive frequency may be in the MHz range, for example in the range 0.5 to 1.5 MHz for example 1 MHz. It will be appreciated that other frequencies may be used, for example depending on the particular LC circuit 205a, 205b (and/or components thereof), and/or susceptor 110 used. For example, it will be appreciated that the resonant frequency of the LC circuit 205a, 205b may be dependent on the inductance L and capacitance C of the circuit 205a, 205b, which in turn may be dependent on the inductor 108a, 208b, capacitor 210a, 210b and susceptor 110 used.

The circuitry 106 comprises a converter 214 arranged to step up an input potential +v 202 to provide the switching potential vs 216 in use. That is, the switching potential vs 216 output by the converter 214 is higher or more positive than the electric potential +v 202 input to the converter 214. For example, the converter 214 may be a DC-to-DC power converter, for example a boost converter (also referred to as a step-up converter). For example, the boost converter may step-up voltage from its input (supply) to its output (load), while stepping down current. For example, the boost converter may be a switched-mode power supply (SMPS) comprising two or more semiconductors, for example a diode and a transistor, and one or more energy storage elements, for example one or both of a capacitor and an inductor, arranged for outputting a potential higher or voltage higher than an input potential or voltage. The amount by which the voltage is stepped-up or boosted can be fixed or variable, and may depend on a user input (e.g., a button or a strength of a puff as detected by a puff sensor (not shown)). The converter 214 is common to each of the plurality of driver arrangements 104a, 204b. That is the converter 214 is arranged for supplying the switching potential vs 216 to each of the plurality of driver arrangements 204a, 204b in use. The converter 214 electrically connected to the battery 104, which provides the input potential +v 202 in use. Specifically, the converter is electrically connected to at least the positive terminal of the battery 104 providing the input potential +v 202. The DC power source or battery 104 may provide the input direct current in use and may also provide the input potential +v 202 in use.

The circuitry 106 comprises a supply bus 210 for supplying the switching potential vs 216 from the converter 214 to the driver controller 208a, 208b of each driver arrangement 204a, 204b. The supply bus 210 is controllable to supply the switching potential vs 216 to one or more of the plurality of driving arrangements 204a, 204b. Specifically, the circuitry 106 comprises a supply bus controller 212 arranged to control the supply bus 210 to supply the switching potential vs 216 to a selectable one or more of the plurality of driving arrangements 204a, 204b in use, i.e. to a selectable one or more of the driver controllers 208a, 208b of the driving arrangements 204a, 204b in use. For example, the supply bus controller 212 may control the supply bus 210 to supply the switching potential vs 216 to none of the driver arrangements 204a, 204b. In this case, none of the driver arrangements 204a, 204b may provide an alternating current to the respective induction elements 108a, 108b, and hence no inductive heating of the susceptor 110 may occur. As another example, the supply bus controller 212 may control the supply bus 210 to supply the switching potential vs 216 to a first 204a of the driver arrangements 204a, 204b, but not to a second 204b of the driver arrangements. In this case, only the first driver arrangement 204a may provide an alternating current to the respective induction element 108a, and hence only a portion of the susceptor 110 may be inductively heated. As another example, the supply bus controller 212 may control the supply bus 210 to supply the switching potential vs 216 to both the first driver arrangement 204a and the second driver arrangements 204b. In this case, both the first driver arrangement 204a and the second driver arrangement 204b may provide an alternating current to the respective induction elements 108a, 208b and hence a larger portion of susceptor 110 may be inductively heated, for example. In such a way, the supply bus 210 and the supply bus controller 212 may provide for control over the inductive heating of the susceptor 110, and hence for example for control over the heating of the aerosol generating material (not shown in FIG. 2) and hence for example for control over the aerosol generation of the overall aerosol generating device (not shown in FIG. 2).

In use, when one or more of the driver controllers 208a, 208b is activated, for example when the supply bus controller 212 is controlled to supply the switching potential vs 216 to one or more of the driver controllers 208a, 208b, for example by a user, the or each driver controller 208a, 208b may control the respective driver arrangement 204a, 204b to drive alternating current through the respective LC circuit 205a, 205b and hence through the respective induction element 108a, 108b, thereby inductively heating the susceptor 110 (which then may heat an aerosol generating material (not shown in FIG. 2) to produce an aerosol for inhalation by a user, for example).

Providing the converter 214 to supply the switching potential vs 216 needed to switch the transistors of the driver arrangements 204a, 204b (which switching potential is higher than the potential +v 202 provided by the battery 104, as explained in more detail below) removes the need to provide a separate DC power supply or battery for this purpose, and hence reduces the cost and complexity of the circuitry and hence overall aerosol generating device. Further, that the converter 214 is a global converter, i.e. it is common to each of the plurality of driver arrangements 204a, 204b, i.e. it provides the switching potential vs 216 for each of the plurality of driver arrangements 204a, 204b, removes the need for each driver arrangement 204a, 204b to have its own individual local converter to provide the switching potential vs 216 to the driver arrangement 204a, 204b, and hence reduces the complexity and cost of the circuitry.

Referring now to FIG. 3, there is illustrated schematically in more detail one of the driver arrangements 204a and its associated LC circuit 205a, according to an example. Each of the plurality of driver arrangements 204a, 204b described above with reference to FIG. 2 may be the same as or similar to the example driver arrangement 204a illustrated in FIG. 3. It will be appreciated that in this case, each driver arrangement 204a, 204b will be arranged for driving its associated LC circuit 205a, 205b comprising the associated induction element 108a, 108b.

The driver arrangement 204a comprises one or more transistors Q1, Q2, Q3, Q4 controllable by the switching potential vs 216 to substantially allow current to pass therethrough in use. In the example illustrated in FIG. 3, the driver arrangement 204a comprises a plurality of transistors, specifically four transistors Q1, Q2, Q3, Q4, arranged in a H-bridge configuration (note that transistors arranged or connected in a H-bridge configuration may be referred to as a H-bridge). The H-bridge configuration comprises a high side pair 304 of transistors Q1, Q2 and a low side pair 306 of transistors Q3, Q4. A first transistor Q1 of the high side pair 304 is electrically adjacent to a third transistor Q3 of the low side pair 306, and a second transistor Q2 of the high side pair 304 is electrically adjacent to a fourth transistor Q4 of the low side pair 314. The high side pair 304 are for connection to a first electric potential +v 202 higher than a second electric potential GND 206 to which the low side pair 306 are for connection. In this example, the driver arrangement 204a is arranged for connection of the DC power source 104 (not shown in FIG. 3) across a first point 322 between the high side pair 304 of transistors Q1, Q2 and a second point 320 between the low side pair 306 of transistors Q3, Q4. Specifically, the first point 322 is for connection to a positive terminal of the battery (not shown) and the second point 320 is for connection to a negative terminal of the battery (not shown) or ground. In use therefore, a potential difference is established between the first point 322 and the second point 320.

Figure 3:
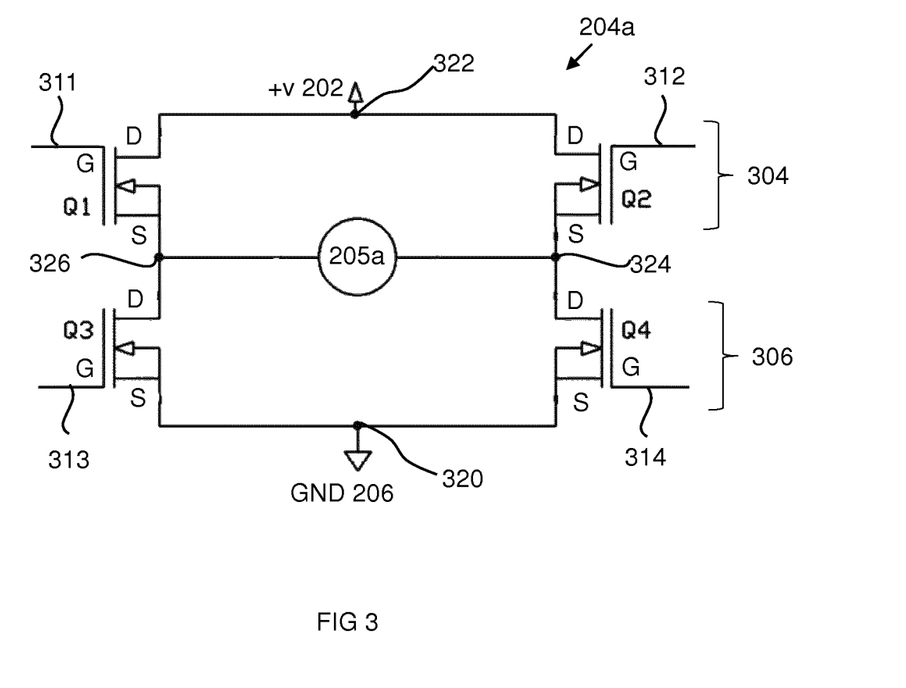
FIG. 3 illustrates schematically a driver arrangement according to an example.

As with FIG. 2, the driver arrangement 204a illustrated in FIG. 3 is electrically connected to, and arranged to drive, the LC circuit 208a comprising the induction element (not shown in FIG. 3). Specifically, the induction element (as part of the LC circuit 208) is connected across a third point 324 between one of the high side pair of transistors Q2 and one of the low side pair of transistors Q4 and a fourth point 326 between the other of the high side pair of transistors Q1 and the other of low side second pair of transistors Q3.

Each transistor Q1, Q2, Q3, Q4 is a field effect transistor controllable by the switching potential vs 216 to substantially allow current to pass therethrough in use. Each field effect transistor Q1, Q2, Q3, Q4 comprises a source S, a drain D, and a gate G. The switching potential is provided to the gate of each field effect transistor, which as described above may allow current to pass between the source S and the drain D of each field effect transistor Q1, Q2, Q3 Q4. Accordingly, each field effect transistor Q1, Q2, Q3, Q4 is arranged such that, when the switching potential is provided to the field effect transistor Q1, Q2, Q3, Q4 then the field effect transistor Q1, Q2, Q3, Q4, substantially allows current to pass therethrough, and when the switching potential is not provided to the field effect transistor Q1, Q2, Q3, Q4, then the field effect transistor Q1, Q2, Q3, Q4 substantially prevents current from passing therethrough. In the example illustrated in FIG. 3, each field effect transistor Q1, Q2, Q3, Q4 has an associated switching potential line or connection 311, 312, 313, 314 (respectively) for carrying the switching potential thereto.

The associated driver controller (not shown in FIG. 3a, but see the driver controller 208a in FIG. 2) is arranged to control supply of the switching potential to each field effect transistor Q1, Q2, Q3, Q4. Specifically, the driver controller is arranged to control the supply of the switching potential vs 216 to each supply line or connection 311, 312, 313, 314 independently, thereby to independently control whether each respective transistor Q1, Q2, Q3, Q4 is in an "on" mode (i.e. low resistance mode where current passes therethrough) or an "off" mode (i.e. high resistance mode where substantially no current passes therethrough).

By controlling the timing of the provision of the switching potential to the respective field effect transistors Q1, Q2, Q3, Q4, the driver controller 208a may cause alternating current to be provided to the associated LC circuit 205a, and hence for alternating current to be provided to the associated induction element (not shown in FIG. 3a) thereof. For example, at a first time, the driver controller 208a may be in a first switching state, where a switching potential is provided to the first and the fourth field effect transistors Q1, Q4, but not provided to the second and the third field effect transistors Q2, Q3. Hence the first and fourth field effect transistors Q1, Q4 will be in a low resistance mode, whereas second and third field effect transistors Q2, Q3 will be in a high resistance mode. Therefore, at this first time, current will flow from the first point 322 of the driver arrangement 204a, through the first field effect transistor Q1, through the LC circuit 205a in a first direction (left to right in the sense of FIG. 3), through the fourth field effect transistor Q4 to the second point 320 of the driver arrangement 204a. However, at a second time, the driver controller 208a may be in a second switching state, where a switching potential is provided to the second and third field effect transistors Q2, Q3, but not provided to the first and the fourth field effect transistors Q1, Q4. Hence the second and third field effect transistors Q2, Q3 will be in a low resistance mode, whereas first and fourth field effect transistors Q1, Q4 will be in a high resistance mode. Therefore, at this second time, current will flow from the first point 322 of the driver arrangement 204, through the second field effect transistor Q2, through the LC circuit 205a in a second direction opposite to the first direction (i.e. right to left in the sense of FIG. 3), through the third field effect transistor Q3 to the second point 320 of the driver arrangement 204. By alternating between the first and second switching state therefore, the driver controller 208a may control the driver arrangement 204a to provide (i.e. drive) alternating current through the LC circuit 205a and hence through the induction element 108a. It will be appreciated that the same control scheme may be employed by the other driver controller 208b for the other driver arrangement 204b associated with the other induction element 108b of the other LC circuit 205b.

At least one of the high side pair of transistors Q1, Q2 is an n-channel field effect transistor, for example an enhancement mode n-channel metal-oxide-semiconductor field effect transistor. Specifically, in this example, both of the high side pair of transistors Q1, Q2 are n-channel field effect transistors. Similarly, in this example, both of the low side pair of transistors Q3, Q4 are n-channel field effect transistors, for example enhancement mode n-channel metal-oxide-semiconductor field effect transistors.

As also described above, for n-channel FETs, the drain terminal D is placed at a higher potential than the source terminal S (i.e. there is a positive drain-source voltage, or in other words a negative source-drain voltage), and in order to turn the n-channel FET "on" (i.e. to allow current to pass therethrough), the switching potential applied to the gate terminal G needs to be is higher than the potential at the source terminal S. Since the high side pair 304 of transistors Q1, Q2 are n-channel field effect transistors, at certain times during operation of the driver arrangement 204a, the potential experienced at the source terminal S of those n-channel filed effect transistors Q1, Q2 is +v 202. Therefore, the switching potential vs 216 provided to the gates G of those transistors in order to turn them on needs to be higher than +v 202, (i.e. higher than the potential provided by the positive terminal of the DC power source 104). The converter 214 provides, via the supply bus 210 and the driver controller 208a, such a switching potential vs 216 to the high side n-channel filed effect transistors Q1, Q2, thereby allowing appropriate operation of those transistors.

For the low side pair 306 of n-channel field effect transistors Q3, Q4, the potential experienced at their source terminals S will be GND 206. Hence for the low side pair 306 of n-channel field effect transistors Q3, Q4, the switching potential applied to their gate terminal G to turn them "on" need not necessarily be higher than +v 202, and may be any potential higher than GND 206. Nonetheless, the switching potential vs 202 used for the high side pair 304 of n-channel field effect transistors Q1, Q2 can also be used for the low side pair 306 of n-channel field effect transistors Q3, Q4, as this switching potential vs 216 is higher than GND 206. The switching potential vs 216 provided by the converter 214 common to each of the plurality of driver arrangements 204a, 204b can therefore be used as the switching potential vs 216 for each of the n-channel field effect transistors Q1, Q2, Q3, Q4 of each of the driver arrangements 204a, 204b, hence reducing the complexity and hence cost of the circuitry, for example as compared to providing separate converters for each driver arrangement 204a, 204b, or for example as compared to providing different switching voltages for different ones of the transistors Q1, Q2, Q3, Q4 of each driver arrangement 204a, 204b.

As mentioned above, n-channel FETs such as n-MOSFETs typically have a relatively low source-drain resistance generates relatively little heat in use and hence wastes relatively little energy in operation. The use of an n-channel FET such as an n-MOSFET as one or more (or each) of the transistors Q1, Q2, Q3, Q4 of a driver arrangement 204a, 204b may therefore provide for efficient operation.

Further, as mentioned above, n-channel FETs such as n-MOSFETs typically have relatively short switching times (e.g. a characteristic response time from changing the switching potential provided to the gate terminal G to the FET changing whether or not current passes therethrough), which can allow for relatively high switching rates. For example, the turn off delay time for an n-MOSFET may be 70 ns. The use of an n-channel FET such as an n-MOSFET as one or more (or each) of the transistors Q1, Q2, Q3, Q4 of a driver arrangement 204a, 204b may therefore provide for the associated induction elements 108a, 108b to be driven at relatively high frequencies, which may for example provide for more flexible operation.

Further, during the operation of each driver arrangement 204a, 204b, there may be a short time when both the first transistor Q1 of the high side pair 304 and the third transistor Q3 of the low side pair (or both the second transistor Q2 of the high side pair 304 and the fourth transistor Q4 of the low side pair) are open or "on", at which point a significant amount of current can be momentarily conducted through the driver arrangement 204a, 204b without passing through the induction element 108a, 108b. This loss is referred to as "shoot-through", and may occur twice per cycle. The shoot-through loss may become higher at higher switching frequencies (lower switching periods), for example when the switching period becomes comparable to the switching time of the transistors. The use of an n-channel FET such as an n-MOSFET (which have relatively short switching times) as one or more (or each) of the transistors Q1, Q2, Q3, Q4 of a driver arrangement 204a, 204b may therefore provide for the minimization of shoot-through loss, and hence provide for a more efficient operation.

In the above example, each of the transistors Q1, Q2, Q3, Q4 of each driving arrangement 204a, 204b were n-channel field effect transistors. However, it will be appreciated that this need not necessarily be the case and that in other examples each driver arrangement 204a, 204b may comprise one or more first transistors each controllable by a switching potential provided by the converter 214 to substantially allow current to pass through that transistor in use. The cost and/or complexity reduction benefit of the converter 214 being common to each of the plurality of driver arrangements 204a, 204 may nonetheless be provided.

In the above examples, each driver arrangement 204a, 204b comprised four transistors Q1, Q2, Q3, Q4 arranged in a H-bridge configuration but it will be appreciated that in other examples one or more of the driver arrangements 204a, 204b may comprise further transistors, that may or may not be part of the H-bridge configuration.

Although in the above examples, the field effect transistors Q1, Q2, Q3, Q4 were depletion mode metal-oxide field effect transistors, it will be appreciated that this need not necessarily be the case and that in other examples other types of field effect transistors may be used.

The above examples are to be understood as illustrative examples of the disclosure. It is to be understood that any feature described in relation to any one example may be used alone, or in combination with other features described, and may also be used in combination with one or more features of any other of the examples, or any combination of any other of the other examples. Furthermore, equivalents and modifications not described above may also be employed without departing from the scope of the invention, which is defined in the accompanying claims.

The invention claimed is:

1. Circuitry for a plurality of induction elements for an aerosol generating device, the plurality of induction elements being for inductive heating of one or more susceptors for heating aerosol generating material in use, the circuitry comprising:
    a plurality of driver arrangements, each one of the plurality of driver arrangements being arranged to provide, from an input direct current, an alternating current to a respective one of the plurality of induction elements in use, each of the plurality of driver arrangements comprising one or more first transistors each controllable by a switching potential to substantially allow current to pass therethrough in use, wherein one or more of the plurality of driver arrangements comprises a plurality of transistors arranged in an H-bridge configuration, one or more of the plurality of transistors is one of the one or more first transistors, the H-bridge configuration comprises a high side pair of transistors and a low side pair of transistors, the high side pair of transistors being for connection to a first electric potential higher than a second electric potential to which the low side pair of transistors is for connection is use, and one or both of the high side pair of transistors is one of the one or more first transistors; and
    a converter arranged to step up an input potential to provide the switching potential in use, the converter being common to each of the plurality of driver arrangements.

2. The circuitry according to claim 1, wherein the converter is arranged such that in use the switching potential is higher than the first electric potential.

3. The circuitry according to claim 1, wherein one or both of the low side pair of transistors is one of the one or more first transistors.

4. The circuitry according to claim 1, wherein each of the plurality of driver arrangements is arranged for connection of a DC power source in use across a first point between the high side pair of transistors and a second point between the low side pair of transistors.

5. The circuitry according to claim 1, wherein each of the plurality of driver arrangements is arranged for connection of the respective one of the plurality of induction elements in use across a third point between one of the high side pair of transistors and one of the low side pair of transistors and a fourth point between the other of the high side pair of transistors and the other of low side second pair of transistors.

6. The circuitry according to claim 1, wherein each of the one or more first transistors is arranged such that, when the switching potential is provided to each of the one or more first transistors then each of the one or more first transistors substantially allows current to pass therethrough, and when the switching potential is not provided to each of the one or more first transistors then each of the one or more first transistors substantially prevents current from passing therethrough.

7. The circuitry according to claim 1, wherein each of the one or more first transistors is a field effect transistor.

8. The circuitry according to claim 7, wherein each of the one or more first transistors comprises a source, a drain, and a gate, and wherein in use the switching potential is provided to the gate of each of the one or more first transistors.

9. The circuitry according to claim 1, wherein each of the one or more first transistors is an n-channel field effect transistor.

10. The circuitry according to claim 1, wherein each of the one or more first transistors is a metal-oxide-semiconductor field effect transistor.

11. The circuitry according to claim 1, wherein the circuitry comprises a supply bus for supplying the switching potential from the converter to the plurality of driving arrangements in use.

12. The circuitry according to claim 11, wherein the supply bus is controllable to supply the switching potential to one or more of the plurality of driving arrangements in use.

13. The circuitry according to claim 11, wherein the circuitry comprises a supply bus controller arranged to control the supply bus to supply the switching potential to a selectable one or more of the plurality of driving arrangements in use.

14. The circuitry according to claim 1, wherein each of the plurality of driving arrangements comprises a driver controller arranged to control supply of the switching potential to the one or more first transistors of the driving arrangement.

15. The circuitry according to claim 1, wherein each of the plurality of driver arrangements is arranged for common connection to a DC power source to provide the input direct current in use.

16. The circuitry according to claim 1, wherein the converter is arranged for connection to a DC power source to provide the input potential in use.

17. The circuitry according to claim 1, wherein the converter is or comprises a boost converter.

18. An aerosol generating device comprising:
the circuitry according to claim 1.

19. The aerosol generating device according to claim 18, the aerosol generating device further comprising:
a DC power source, the DC power source being arranged to provide, in use, at least one of the input direct current or the input potential.

20. The aerosol generating device according to claim 18, the aerosol generating device further comprising:

the plurality of induction elements, wherein each of the plurality of driver arrangements is arranged to provide alternating current to a respective one of the plurality of induction elements in use.

21. The aerosol generating device according to claim 20, the aerosol generating device further comprising:

the one or more susceptors, wherein the one or more susceptors are arranged to be inductively heated by the plurality of induction elements in use.

22. The aerosol generating device according to claim 21, wherein the aerosol generating device further comprises:

the aerosol generating material, wherein the aerosol generating material is arranged to be heated by the one or more susceptors in use.

23. The aerosol generating device according to claim 22, wherein the aerosol generating material is or comprises tobacco.

* * * * *